United States Patent
Gasparakis (10) Patent No.: US 10,193,760 B2
(45) Date of Patent: *Jan. 29, 2019

(54) HYBRID SDN CONTROLLER

(71) Applicant: Intel Corporation, Santa Clara, CA (US)

(72) Inventor: Iosif Gasparakis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,598

(22) Filed: Aug. 22, 2017

(65) Prior Publication Data

US 2017/0353359 A1    Dec. 7, 2017

Related U.S. Application Data (63) Continuation of application No. 14/142,275, filed on Dec. 27, 2013, now Pat. No. 9,742,632.

(51) Int. Cl.
  *H04L 12/24* (2006.01)
(52) U.S. Cl.
  CPC .................... *H04L 41/12* (2013.01)
(58) Field of Classification Search
  CPC ......... H04L 43/08; H04L 41/12; H04L 45/22; H04L 45/18; H04L 45/28; H04L 45/64
  See application file for complete search history.

(56) References Cited

U.S. PATENT DOCUMENTS

| | | | |
|---|---|---|---|
| 7,725,603 B1* | 5/2010 | Kanevsky | H04L 45/02 709/204 |
| 9,742,632 B2* | 8/2017 | Gasparakis | H04L 41/12 |
| 2011/0093251 A1* | 4/2011 | Belgaied | G06F 17/509 703/13 |
| 2014/0112192 A1* | 4/2014 | Chou | H04L 41/042 370/254 |
| 2015/0026313 A1* | 1/2015 | Chawla | H04L 47/24 709/220 |
| 2015/0188772 A1 | 7/2015 | Gasparakis | |

FOREIGN PATENT DOCUMENTS

DE    102014117461 A1    2/2015

OTHER PUBLICATIONS

Office Action issued in U.S. Appl. No. 14/142,275, dated Apr. 4, 2016, 14 pages.
Final Office Action issued in U.S. Appl. No. 14/142,275, dated Oct. 6, 2016, 12 pages.
Office Action issued in U.S. Appl. No. 14/142,275, dated Jan. 9, 2017, 7 pages.

(Continued)

*Primary Examiner* — Kim T Nguyen
(74) *Attorney, Agent, or Firm* — Grossman, Tucker, Perreault & Pfleger, PLLC (57) ABSTRACT

One embodiment provides a network interface controller. The network interface controller includes a portion of a hybrid software-defined networking ("SDN") controller, the portion of the hybrid SDN controller including a service abstraction layer module ("SAL") and a southbound application programming interface ("SB API"), the SAL including a representation of a physical network.

15 Claims, 7 Drawing Sheets

(56) References Cited

OTHER PUBLICATIONS

Notice of Allowance issued in U.S. Appl. No. 14/142,275, dated Apr. 20, 2017, 7 pages.
Chinese Office Action issued in Chinese Application No. 201410777926.1, dated Aug. 22, 2017, with English machine translation, 12 pages.
Notice of Allowance issued in Chinese Patent Application No. 201410777926.1, dated Apr. 24, 2018, 4 pages.

* cited by examiner

```
Generating a custom module
by, e.g., a workstation
702
         │
         ▼
Providing the custom
module to the network
interface controller
704
         │
         ▼
Accessing the physical network
using the custom module
706
```

```
Monitoring network traffic on the
physical network, e.g., by the
network interface controller
802
         │
         ▼
Determining whether a physical
network topology has changed based,
at least in part on, network traffic
804
         │
         ▼
Communicating a change in physical
network topology to a host in a format
selected by the host
806
```

FIG. 8

HYBRID SDN CONTROLLER

CROSS-REFERENCE TO RELATED APPLICATIONS

The present application is a continuation of U.S. patent application Ser. No. 14/142,275 filed Dec. 27, 2013, the entire disclosure of which is incorporated herein by reference.

FIELD

This disclosure relates to an SDN (Software-Defined Networking) controller, and, more particularly, to a hybrid SDN controller.

BACKGROUND

Generally, conventional networks include a plurality of interconnected network devices, e.g., switches, routers, etc., that are each configured to receive and to forward packets and/or frames according to respective internal settings. These internal settings are generally configured at provisioning and may require physical access to the network device in order to change settings. In some cases, the configurations may be proprietary. Further, the network devices are typically configured with only a local view of a portion of the network, e.g., for fault tolerance. Each network device is configured to make routing and/or forwarding decisions based on this local view. Thus, such network devices may not be responsive to dynamically changing network traffic, changes to node(s) coupled to the network nor to mobility of user devices connected to the network.

Software-defined networking (SDN) is intended to address many of these characteristics of such conventional network architectures. SDN is designed to decouple the data plane (i.e., the network devices) from the control plane (e.g., routing decision rules and policies). In SDN, the control plane may be centralized and/or may be distributed and the data plane includes a plurality of interconnected network devices that are remotely programmable by the control plane.

An SDN controller may be configured to monitor network traffic and/or state(s) of the node(s). The SDN controller may execute on a server located at a data center, for example. The SDN controller is configured to have a centralized global view of the network and is further configured to program the network devices dynamically, based, at least in part, on network traffic, state(s) of the node(s) and/or policies set by, e.g., network administrators. The network devices are generally configured with a standardized programming interface making programming and reprogramming them relatively straightforward and not restricted to vendor-specific protocols. Thus, a SDN network architecture is configured to be dynamically reprogrammable by SDN controllers based, at least in part, on business enterprise policies.

SDN controllers are typically implemented as a computer program executing on, for example, a server in a data center. The server may include a host and a network interface coupled to the host. An SDN controller is typically configured to perform SDN controller operations on the host and to transmit and/or receive network-related data via the network interface. The SDN controller may include a plurality of architectural elements configured to facilitate monitoring and control of the physical network and its associated network devices. These elements of an SDN controller may typically be written in a relatively high level object-oriented language such as Java. For example, networking logic, i.e., creating objects and making logical decisions based on policies, are generally easier to implement in a high-level language.

For example, the policies may be written in an extensible markup language (XML) configured to encode the policies in a format that is both human-readable and machine-readable. It is generally desirable for the SDN controller elements "closest" to the network devices to be efficiently coded. High level computer languages are typically designed for ease of programming and/or readability rather than efficiency, thus, generating efficient executable code for SDN controller elements closer to network devices may take considerable time and effort.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure is related to a hybrid SDN (Software Defined Networking) controller. As used herein, a hybrid SDN controller corresponds to an SDN controller that has a first portion configured to be implemented on a host included in a computing device, e.g., a server, and a second portion configured to be implemented on a network interface (i.e., a network interface controller ("NIC")) included in the computing device. The first portion of the hybrid SDN controller may include northbound Application Programming Interface(s) (API(s)), and networking logic (i.e., network service functions, network orchestration functions and network management functions). The second portion of the hybrid SDN controller may include a southbound API and a service abstraction layer (e.g., SAL module) that includes a representation of the physical network.

Thus, a NIC consistent with various embodiments of the present disclosure is configured as a functional unit that includes network interface functionality as well as the portion of the hybrid SDN controller that includes the service abstraction layer and the southbound API. The service abstraction layer and southbound API may be efficiently coded. For example, the SAL module and southbound API may be provided with the NIC by and/or on behalf of, e.g., an original equipment manufacturer (OEM). In some embodiments, custom module(s) related to the southbound API may be implemented by an enterprise. The custom module(s) may be generated using, e.g., libraries provided by an OEM. Implementing the service abstraction layer and southbound API on the NIC is further configured to reduce processing load on the host. Networking logic may continue to be coded in a high level object oriented language without affecting the NIC programming. Distributing the SDN control functions between the host and the NIC is configured to be transparent to application(s) executing on node(s) in the physical network.

Figure 1:
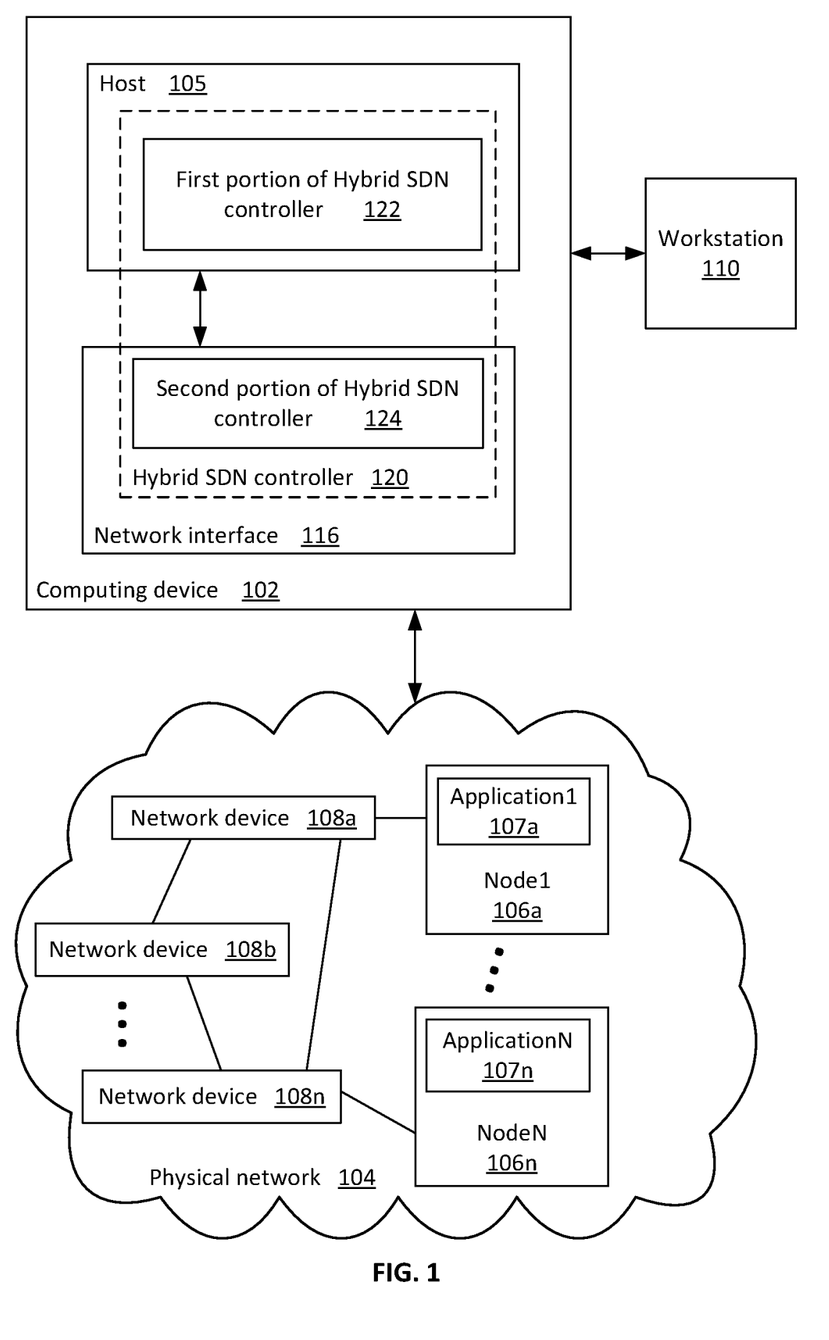
FIG. 1 illustrates an example network system consistent with various embodiments of the present disclosure.

FIG. 1 illustrates an example network system 100 consistent with various embodiments of the present disclosure. The system 100 generally includes a computing device 102 and a physical network 104. The system 100 may include a workstation 110 configured to provide a user interface to facilitate programmability of the hybrid SDN controller 120, as described herein. The computing device 102 is configured to communicate with the physical network 104. For example, the computing device 102 may be a server in, e.g., a data center configured to manage the physical network 104 using a hybrid SDN controller, as described herein.

Physical network 104 may include at least one node 106a, . . . , 106n and a plurality of interconnected network devices 108a, . . . , 108n. Physical network 104 is configured to couple each node 106a, . . . , 106n to each other node 106a, . . . , 106n. "Node" may represent a computer node element (e.g., host server system, desktop computer, laptop computer, tablet computer, etc.), switch, router, hub, network storage device, network attached device, non-volatile memory (NVM) storage device, cloud-based server and/or storage system, a blade, a smartphone, a feature phone, etc. Node(s) 106a, . . . , 106n may be at fixed location(s) and/or may be mobile. Network devices 108a, . . . , 108n may include switch(es), bridge(s), router(s) (wired and/or wireless). At least some of the network devices 108a, . . . , 108n are configured to be accessed and/or programmed by, e.g., computing device 102, as described herein. The programmability, related to SDN, is configured to modify a behavior, e.g., routing behavior, of the network device 108a, . . . , 108n.

Each node 106a, . . . , 106n may include at least one respective application 107a, . . . , 107n. The applications 107a, . . . , 107n are configured to communicate (e.g., transfer packets that include data) between nodes 106a, . . . , 106n via physical network 104. The applications 107a, . . . , 107n may be configured to request, e.g., routing and/or path characteristics from hybrid SDN controller 120 based, at least in part, on a type of data included in the packets. For example, voice and/or video data may correspond to a low latency path. The hybrid SDN controller 120 may then be configured to establish an appropriate path and to route packets from the requesting application along this path.

The computing device 102 and the node(s) 106a, . . . , 106n may communicate with each other using a switched fabric communications protocol, for example, an Ethernet communications protocol, Infiniband communications protocol, etc. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. The Infiniband protocol may comply or be compatible with the Infiniband specification published by the InfiniBand Trade Association (IBTA), titled "InfiniBand™ Architecture Specification", Volume 1, Release 1.2.1, published June 2001 and/or later versions of this specification, for example, InfiniBand™ Architecture, Volume 1 (General Specification), Release 1.2.1, published January 2008 and Volume 2 (Physical Specification), Release 1.3, published November 2012. Of course, in other embodiments, the switched fabric communications protocol may include a custom and/or proprietary switched fabric communications protocol.

Physical network 104 may include any packet-switched network such as, for example, Ethernet networks as set forth in the IEEE 802.3 standard and/or a wireless local area network such as, for example, IEEE 802.11 standard. The wireless protocol may comply or be compatible with the Wireless standard published by the IEEE titled "802.11-2012-IEEE Standard for Information technology—Telecommunications and information exchange between systems Local and metropolitan area networks—Specific requirements Part 11: Wireless LAN Medium Access Control (MAC) and Physical Layer (PHY) Specifications", published April 2012, and/or later versions of this standard.

The computing device 102 generally includes a host 105 and a network interface 116. The computing device 102 further includes a hybrid SDN controller 120 consistent with various embodiments of the present disclosure. The hybrid SDN controller 120 includes a first portion 122 and a second portion 124. The first portion 122 is configured to be implemented on the host 105. The second portion 124 is configured to be implemented on the network interface 116.

Figure 2:
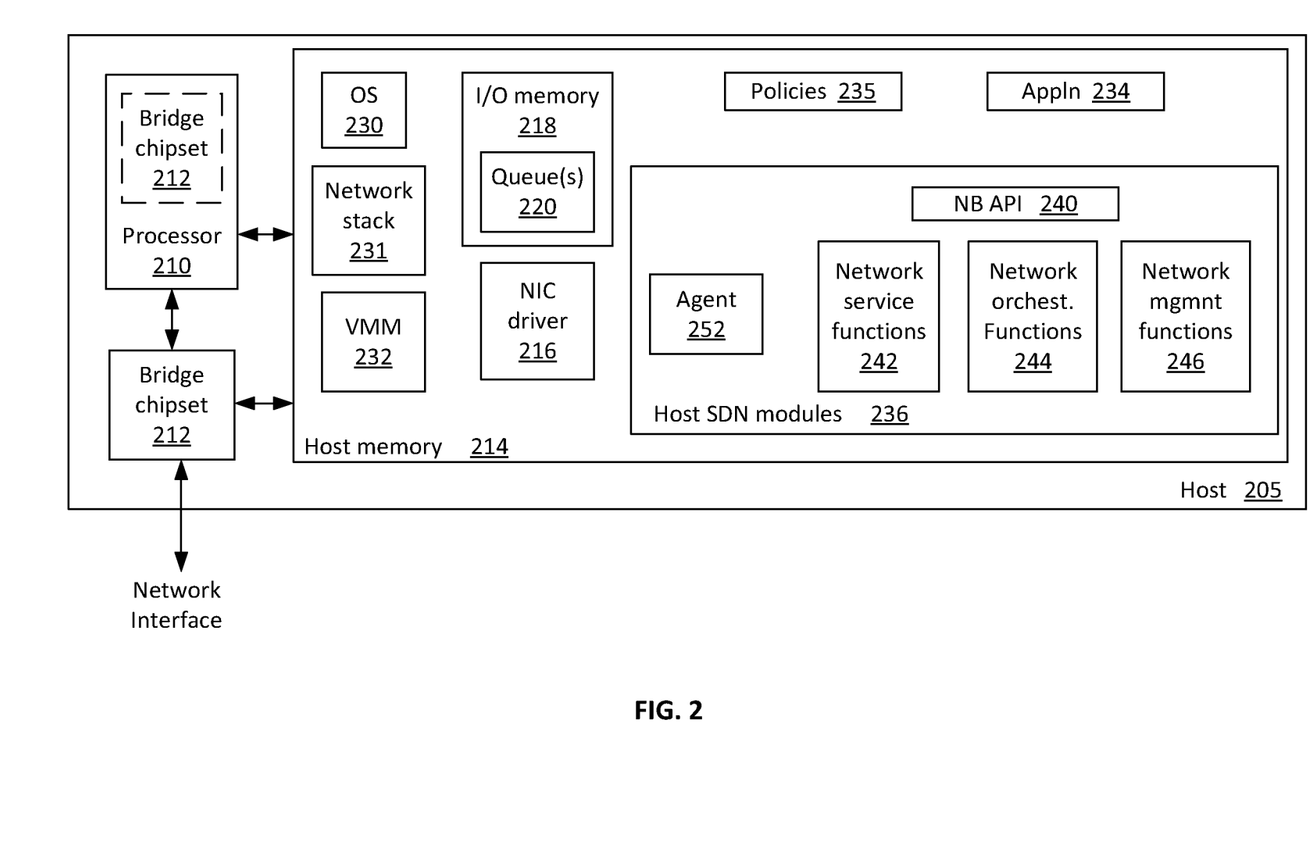
FIG. 2 illustrates an example host consistent with various embodiments of the present disclosure.

FIG. 2 illustrates an example host 205 consistent with various embodiments of the present disclosure. The host 205 generally includes a processor 210, a bridge chipset 212 and a system memory 214. The processor 210 is configured to perform operations associated with computing device 202 and host 205. Processor 210 may include one or more processing unit(s), e.g., core(s). The bridge chipset 212 is configured to couple the host 205 to a network interface, e.g., network interface 116. In an embodiment, the bridge chipset 212 may be coupled to the processor 210. In this embodiment, the bridge chipset 212 may also be coupled to the system memory 214. In another embodiment, the bridge chipset 212 may be included in the processor 210. In this embodiment, the processor 210 (and bridge chipset 212) may also be coupled to the network interface 116.

Host memory 214 is configured to store an operating system OS 230, policies 235 and SDN modules 236. SDN modules 236 corresponds to the first portion 122 of a hybrid SDN controller, consistent with various embodiments of the present disclosure. In some embodiments, host memory 214 may be configured to store an application 234. SDN modules 236 may include northbound API 240, network service functions 242, network orchestration functions 244 and network management functions 246. In some embodiments, SDN modules 236 may include agent 252 configured to provide customization and/or update capability, as described herein. The host memory 214 may be further configured to store a virtual machine monitor (VMM) 232 and may then include a plurality of virtual machines (not shown). The host memory 214 may be configured to store a network stack 231. The network stack 231 may be managed by OS 230. OS 230 may be configured to utilize a software framework configured for efficient and relatively fast packet processing. For example, the software framework may comply or be compatible with the Data Plane Development Kit (DPDK) configured to optimize packet processing on Intel® Architecture processors. Of course the Intel® Architecture is only an example implementation and, in other embodiments, the teachings presented herein may be used for other core architecture technologies as may be provided by, for example, Motorola®, Apple®, . . . etc.

Host memory 214 may further include NIC driver 216 and I/O memory 218. I/O memory 218 may include one or more queue(s) 220. NIC driver 216, I/O memory 218 and/or queue(s) 220 may be utilized for transfer and storage of packets and/or data between host 205 and the network interface.

Northbound (NB) API 240 is configured to provide an applications programming interface between application(s), e.g., application(s) 107a, . . . , 107n and/or application 234 and network service functions 242, network orchestration functions 244 and/or network management functions 246. Network service functions 242 may include, for example, setting specific routes and paths in the network devices 108a . . . 108n in the physical network 104. Network orchestration functions 244 may include, for example, making decisions based on a view of the entire network 104. Network orchestration functions 244 may be configured to utilize network service functions in order to enforce policies 235. Network management functions 246 may include, for example, turning on or off ports and/or portions (e.g., circuit boards, processors, ASICs, etc.) of the network devices 108a . . . 108n included in the physical network 104.

Host SDN modules 236 are configured to perform networking logic operations related to management, configuration and reconfiguration of physical network 104 and network device(s) 108a, . . . , 108n based on policies 235, network traffic and/or network topology changes. Policies may be related to, e.g., high availability (such as fail over paths and routes) and paths with specific requirements for specific applications. For example, a specific path in physical network 104 may be configured to be low latency so that if an application, e.g., application 107a of FIG. 1, is streaming video or voice, the application 107a would be assigned this low latency path. Applications 107a, . . . , 107n and 234 may be configured to utilize northbound API 240 in order to access SDN functions, e.g., network service functions 242, network orchestration functions 244 and/or network management functions 246. These SDN functions may be filtered based on the policies 235. Thus, applications 107a, . . . , 107n and 234 are configured to use NB API 240 as in a conventionally configured SDN controller that has all of the SDN controller elements included in host memory.

Figure 3:
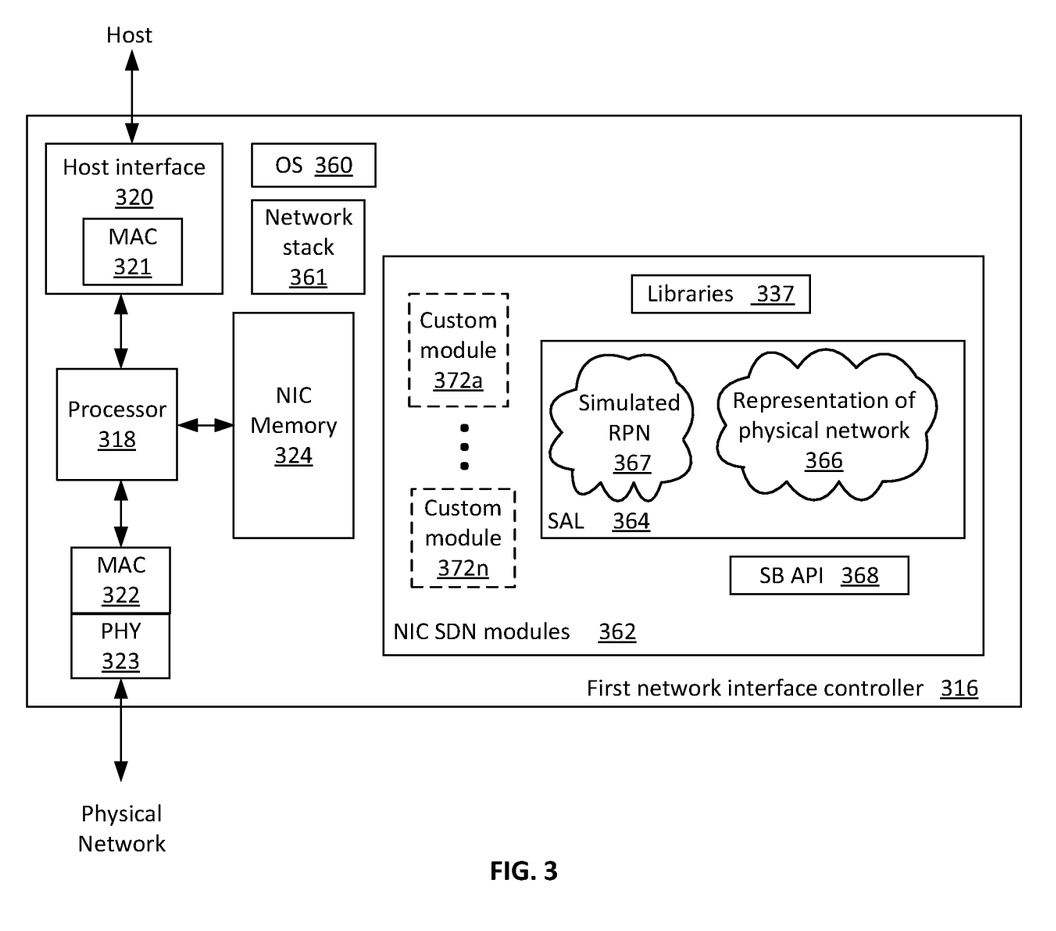
FIG. 3 illustrates an example network interface controller consistent with one embodiment of the present disclosure.

FIG. 3 illustrates an example network interface controller 316 consistent with one embodiment of the present disclosure. First network interface controller 316 is configured to couple a computing device, e.g., computing device 102 (and a host, e.g., host 105) to a physical network, e.g., physical network 104 and thereby to node(s) 106a, . . . , 106n and network device(s) 108a, . . . , 108n. First network interface controller 316 includes processor 318, host interface 320, media access control (MAC) circuitry 322, physical layer circuitry (PHY) 323 and NIC memory 324. Processor 318 is configured to perform operations associated with first network interface controller 316. In some embodiments, processor 318 may correspond to a general purpose processor and may include a plurality of processing units. Host interface 320 is configured to couple first network interface controller 316 to, e.g., bridge chipset 212 of FIG. 2. Host interface 320 may include a media access controller ("MAC") 321 configured to couple first network interface controller 316 to, e.g., host 205 via bridge chipset 212 using, for example, a PCIe (Peripheral Component Interconnect Express) communications protocol. The PCIe communications protocol may correspond to or be compatible with the PCIe 3.0 specification, published by the PCI-SIG (PCI Special Interest Group), titled "PCI Express Base 3.0 Specification", released November 2010, and/or later versions of this specification.

MAC 322 and PHY 323 are configured to couple computing device 102 to, e.g., physical network 104. MAC 322 is configured to perform media access management for transmit and receive functions. PHY circuitry 323 includes transmit circuitry configured to transmit data and/or message packets and/or frames to the physical network 104 including node(s) 106a, . . . , 106n and network devices, 108a, . . . , 108n. PHY circuitry 323 includes receive circuitry configured to receive data and or message packets and/or frames from the physical network 104. Of course, PHY circuitry 323 may also include encoding/decoding circuitry configured to perform analog-to-digital and digital-to-analog conversion, encoding and decoding of data, analog parasitic cancellation (for example, cross talk cancellation), and recovery of received data.

First NIC 316 includes OS 360 and NIC SDN modules 362 and may include network stack 361. NIC SDN modules 362 correspond to the second portion 324 of a hybrid SDN controller, consistent with various embodiments of the present disclosure. NIC SDN modules 362 include service abstraction layer module SAL 364 and southbound application programming interface SB API 368. NIC SDN modules 362 may include libraries 337. Libraries 337 includes functional modules that may be utilized in generating custom modules and/or custom protocols, as described herein. Libraries 337, SAL 364 and SB API 368 may be supplied by and/or on behalf of, e.g., an OEM of NIC 316. The SAL 364 and SB API 368 may be optimized for, e.g., execution efficiency. OS 360 is configured to manage operations of first NIC 316. The SAL 364 includes a representation of the physical network 366. The representation of the physical network 366 may include data structures related to configuration of the physical network 104. For example, the data structures may include number, type, location, interconnection and/or settings for each network device 108a, . . . , 108n. The data structures may further include data related to node(s) 106a, . . . , 106n, e.g., identifier, location, etc.

SB API 368 includes application programming interfaces configured to be utilized for communicating with network device(s) 108a, . . . , 108n in order to access and/or change the configuration of physical network 104. In an embodiment, SB API 368 may include functions that may comply or be compatible with the OpenFlow™ Switch Specification Version 1.1.0 Implemented (Wire Protocol 0x02) dated Feb. 28, 2011, and/or later versions of this specification. In another embodiment, SB API 368 may include custom and/or proprietary functions.

Turning again to FIG. 2, in some embodiments, host memory 214 may include agent 252. Agent 252 is configured to provide customization and/or update capability related to SAL 364 and SB API 368. For example, agent 252 may be utilized to push updates to SAL 364 and/or SB API 368. Updates may include updates to SAL 364, updates to SB API 368 and/or updates to libraries 337. The updates may be provided, for example, by the first NIC 316 OEM. In another example, agent 252 may be utilized to push custom modules, e.g., custom module(s) 372a . . . 372n, from a workstation, e.g., workstation 110, to a network interface controller, e.g., first NIC 316. Agent 252 may be utilized to specify, modify and/or update configuration data related to SAL 364 and/or SB API 368.

Figure 4:
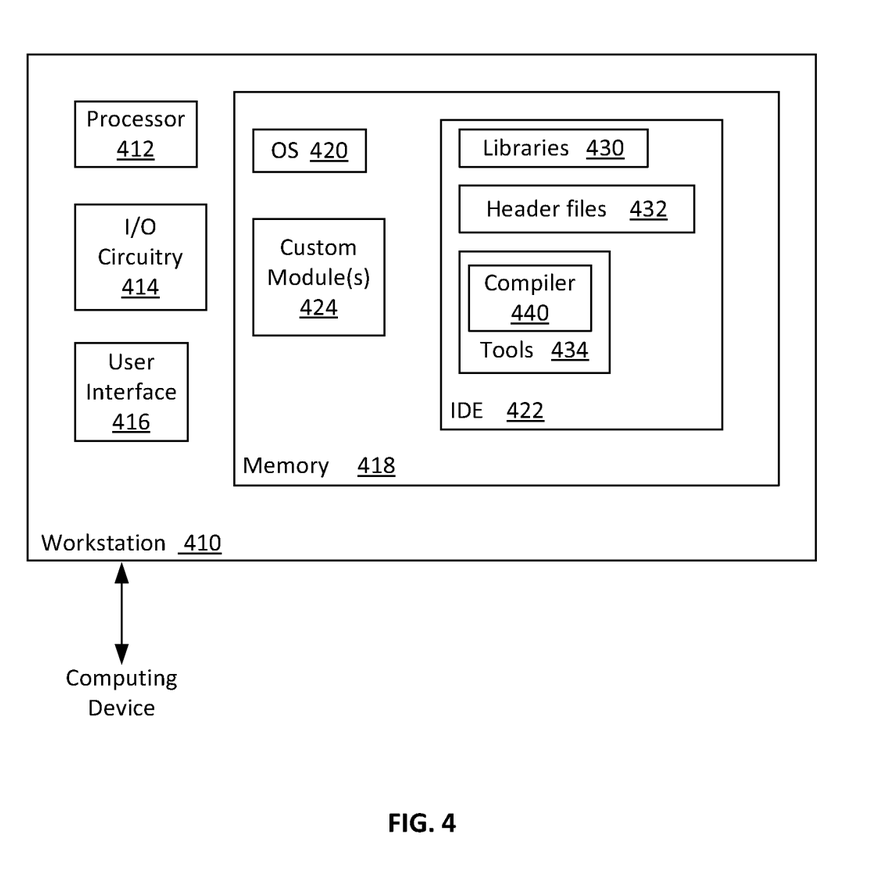
FIG. 4 illustrates an example workstation consistent with various embodiments of the present disclosure.

FIG. 4 illustrates an example workstation 410 consistent with various embodiments of the present disclosure. Workstation 410 is one example of workstation 110 of FIG. 1. Workstation 410 may be utilized by a user, e.g., a system administrator, to generate custom module(s) 424 and/or protocols, e.g., a custom SB API. Workstation 410 includes a processor 412, I/O circuitry 414, a user interface 416 and memory 418. Memory 418 includes an operating system OS 420 and an integrated development environment IDE 422. IDE 422 may be used to generate one or more custom module(s) 424. Custom module(s) 424 correspond to one or more of custom module(s) 372a, . . . , 372n of FIG. 3.

Processor 412 is configured to perform operations of workstation 410. I/O circuitry 414 is configured to couple workstation 410 to computing device 102. In some embodiments, workstation 410 may be coupled to computing device 102 by network 104. In some embodiments, workstation 410 may be directly coupled to computing device 102. User interface 416 may include, e.g., a keyboard and a display and is configured to allow the system administrator to access IDE 422, e.g., to generate and/or test, e.g., custom SB APIs, and/or network configurations.

The IDE 422 is related to hybrid SDN controller 120 and may be provided by, e.g., OEM of the network interface 116. IDE 422 may include libraries 430, header files 432 and/or tools 434. Tools 434 may include a compiler, e.g., a cross compiler, configured to provide executable custom module(s) 424. Libraries 430 may correspond to libraries 337 and may include functional modules that may be utilized in generating custom modules and/or custom protocols.

Workstation 410 and IDE 422 are configured to enable a user, e.g., a network administrator, to generate custom modules and/or protocols, e.g., a custom SB API. The custom modules and/or protocols may then be pushed to a network interface, e.g., first NIC 316 using agent 252. The custom protocols may be embodied, for example, in one or more custom module(s) 372a, . . . , 372n. The custom module(s) 372a, . . . , 372n may then be pushed to first NIC 316 by, e.g., agent 252. In an embodiment, the custom module(s) 372a, . . . , 372n may then be utilized in place of and/or in addition to SB API 368. In another embodiment, the custom module(s) 372a, . . . , 372n may be utilized to implement code changes (such as bug fixes) in the SAL 364.

In an embodiment, SAL 364 may be configured to generate a simulated representation of the physical network 367, e.g., in response to a request from IDE 422. The request may include a change in configuration of the physical network 104. Modifications to control parameters, e.g., network device setting(s), and/or custom module(s) 372a, . . . , 372n related to the requested change in configuration may be pushed to the first NIC 316 by agent 252. The SAL 364 may then be configured to execute testing utilizing the simulated representation of the physical network 367. The SAL 364 may be configured to expose the simulated representation of the physical network 367 to the host 205 and thereby to IDE 422. SAL 364 may be configured to utilize one or more custom module(s) 372a, . . . , 372n, e.g., that produced successful simulation results, in place of and/or in addition to SB API 368.

Thus, modifications to elements of the data plane, e.g., routing behavior of one or more network device(s) 108a, . . . , 108n, may be simulated in the first NIC 316 using SAL 364 and the simulated representation of the physical network 367. The simulated representation of the physical network 367 may then appear to the host 205 and/or IDE 422 as an actual representation of the physical network. In other words, it may be transparent to the host 205 whether the representation of the physical network resides in the host 205 or resides in the first NIC 316.

In some embodiments, depending on a capability of the first NIC 316, a plurality of simulated representations of the physical network may be resident on the first NIC 316. In these embodiments, processor 318 may correspond to a processor capable of virtualization. NIC memory 324 may then include a virtual machine monitor ("hypervisor") and each simulated representation of the physical network may be included in a respective SAL associated with a respective virtual machine. Each simulated representation of the physical network of the plurality of simulated representations of the physical network may be utilized by respective IDEs and associated network administrators.

Thus, IDE 422, agent 252 and SAL 364 are configured to provide customization, simulation and test capabilities of a hybrid SDN controller consistent with various embodiments of the present disclosure. The simulated representation of the physical network 367 may be exposed to the host 205 by SAL 364 resident in the first NIC 316. Custom module(s) 372a, . . . , 372n may be generated and tested and/or control settings may be modified and tested prior to pushing them to the actual physical network 104.

In an embodiment, OS 360 may be configured to maintain a network stack 361 related to operations of first NIC 316. The network stack 361 may include routing tables and/or related network information. OS 360 and/or SAL 364 may then be configured to expose network data to, e.g., host 205 based, at least in part, on the network stack 361 maintained by NIC OS 360. The network data corresponds to network abstracting information related to the representation of the physical network 366. For example, network data may include details of the network topology of physical network 104 related to nodes 106a, . . . , 106n and/or network device(s) 108a, . . . , 108n, e.g., network configuration data (e.g., number, type, location, settings, etc.).

Thus, OS 360 may be configured to maintain a network stack 361 related to the representation of the physical network 366 and the physical network 104. SAL 364 may utilize NIC network stack 361 to build the representation of the physical network 364. In other words, SAL 364 may be configured to translate network data into a form appropriate for SDN controller functionality. The representation of the physical network 366 may include, for example, a set of objects and/or entries in a database, that are related to the node(s) 106a, . . . , 106n and/or network devices(s) 108a, . . . , 108n and their configuration (e.g., control settings). SAL 364 may be further configured to translate the set of objects and/or entries in the database into a target format and to communicate the translated network data to, e.g., the host 205 and SDN modules 236. For example, the target format may include data formats used by web services (i.e., a software system designed to support interoperable machine-to-machine interaction over a network). The data formats may include XML (eXtensible Markup Language), JSON (JavaScript Object Notation) and/or SOAP (Simple Object Access Protocol). XML is a markup language that defines a set of rules for encoding documents in a format that is both human-readable and machine-readable. XML may comply or be compatible with World Wide Web Consortium ("W3C") recommendation, titled "Extensible Markup Language (XML) 1.0 (Fifth Edition)", released Nov. 26, 2008 and/or later versions of this recommendation. JSON is a data-interchange format that is based on a subset of the JavaScript Programming Language, Standard ECMA-262 3rd Edition—December 1999. SOAP is a protocol intended for exchanging structured information in a decentralized, distributed environment. SOAP uses XML technologies to define an extensible messaging framework configured to provide a message construct that can be exchanged over a variety of underlying protocols. SOAP may comply or be compatible with W3C recommendation, titled "SOAP Version 1.2 Part 1: Messaging Framework (Second Edition)", released Apr. 27, 2007 and/or later versions of this recommendation. In another example, the target format may correspond to MIBS (management information base) associated with SNMP (Simple Network Management Protocol). In another example, the target format may correspond to a custom format (e.g., interface) selected by e.g., a network administrator and defined by, e.g., IDE 422. The translated network data may generally include capabilities of each network device 108a, . . . , 108n and may further include configuration settings associated with each network device 108a, . . . , 108n. In some embodiments, the translated network data may include network topology changes related to node(s) 106a, . . . , 106n.

In an embodiment, first NIC 316 may be configured to process received network packets and/or frames that include, e.g., messages and/or data. The received network packets and/or frames may be forwarded to the host, e.g., host 205, without modification, may be modified and then forwarded to host 205 or may not be forwarded to host 205 at all. For example, MAC 322 may be configured to receive network traffic including any packet (i.e., all packets) from the physical network 104. SAL 364 may then be configured to determine a status of the physical network 104 and/or whether the physical network topology has changed based, at least in part, on inspection of the received packets, i.e., the network traffic. Network topology changes may include one or more node(s), e.g., node(s) 106a, . . . , 106n, coupling to or decoupling from the physical network 104, a change in location of a node, link status changes and/or new services being deployed in node(s). Network status may include quality of service, error rate, status information and/or generally any change in resources related to network device(s) 108a, . . . , 108n. SAL 364 may be configured to forward information related to physical network 104 status and/or topology changes to host 205 and to SDN modules 236. Thus, physical network 104 status and/or topology change determinations may be performed by first NIC 316.

In another embodiment, host interface 320 (and MAC 321) may be configured to forward any packets received from the host 205 to MAC 322 for transmission onto the physical network 104. Any useful information included in the packets from host 205 may then be extracted by, e.g., SAL 364. Useful information includes any SDN-related information, e.g., messages to the SB API 368. The useful information may then be interpreted and, utilized to manipulate, e.g., the representation of the physical network 366.

Thus, the SAL 364 may be configured to monitor network operation by configuring MAC 322 to receive all network traffic (i.e., "promiscuous mode") and/or monitoring packets (e.g., messages) from the host 205 to, e.g., SB API 368. The SAL 364 may be further configured to selectively forward information related to network status and/or configuration to host 205 and/or to update the physical representation of the network 366 based, at least in part, on the monitored packets. Thus, capabilities of the first NIC 316 may be exploited to support SDN functionality of hybrid SDN controller that includes host SDN modules 236 and NIC SDN modules 362.

In an embodiment, host 205 may include a complete network stack 231. The network stack 231 may include routing tables and/or related network information. In this embodiment, network data may be maintained by the host 205. A network interface, e.g., first NIC 316 and, e.g., SAL 364 may be configured to communicate network status and/or configuration changes to host 205, e.g., OS 230 and/or SDN modules 236. Modifications to physical network 104 communicated to host 205 may then result in updating of network stack 231. In another embodiment, network stack 231 may correspond to a relatively limited stack. In this embodiment, OS 230 may include a software framework configured for efficient and relatively fast packet processing. For example, the software framework may comply or be compatible with the Data Plane Development Kit (DPDK) configured to optimize packet processing on Intel® Architecture processors. Of course, the Intel® Architecture is only an example implementation and, in other embodiments, the teachings presented herein may be used for other core architecture technologies as may be provided by, for example, Motorola®, Apple®, . . . etc. In both embodiments, processing load on host processor 210 related to packet processing may be generally limited since first NIC 316 (and SAL 364) may be configured to communicate only modifications (i.e., changes) to the physical network 104. Debugging may also be facilitated by configuring, e.g., MAC 322, to monitor all network traffic (i.e., promiscuous mode), as described herein.

Thus, a first portion of a hybrid SDN controller consistent with various embodiments of the present disclosure may be implemented on a host, e.g., host 205, of a computing device, and a second portion of the hybrid SDN controller may be implemented on a network interface controller, e.g., first NIC 316, included in the computing device. The first portion may include host SDN modules 236 (e.g., NB API 240, network service functions 242, network orchestration functions 244 and network management functions 246). The second portion may include the SAL 364 including the representation of the physical network 366, SB API 368 and/or one or more custom module(s) 372a, . . . , 372n configured to communicate with (e.g., control) network device(s) 108a, . . . 108n included in physical network 104. First NIC 316, utilizing e.g., MAC 322 and/or host interface 320 (and MAC 321), may be configured to monitor network traffic and/or packets to be transmitted and to detect physical network 104 status and/or modifications to the physical network 104 topology. SAL 364 may then update the physical representation of the network 366 and may communicate the status and/or modification to host 205. SAL 364 and/or SB API 368 may be efficiently coded by or on behalf of, e.g., the first NIC 316 OEM. Processing load on host processor 210 may this be reduced.

Figure 5:
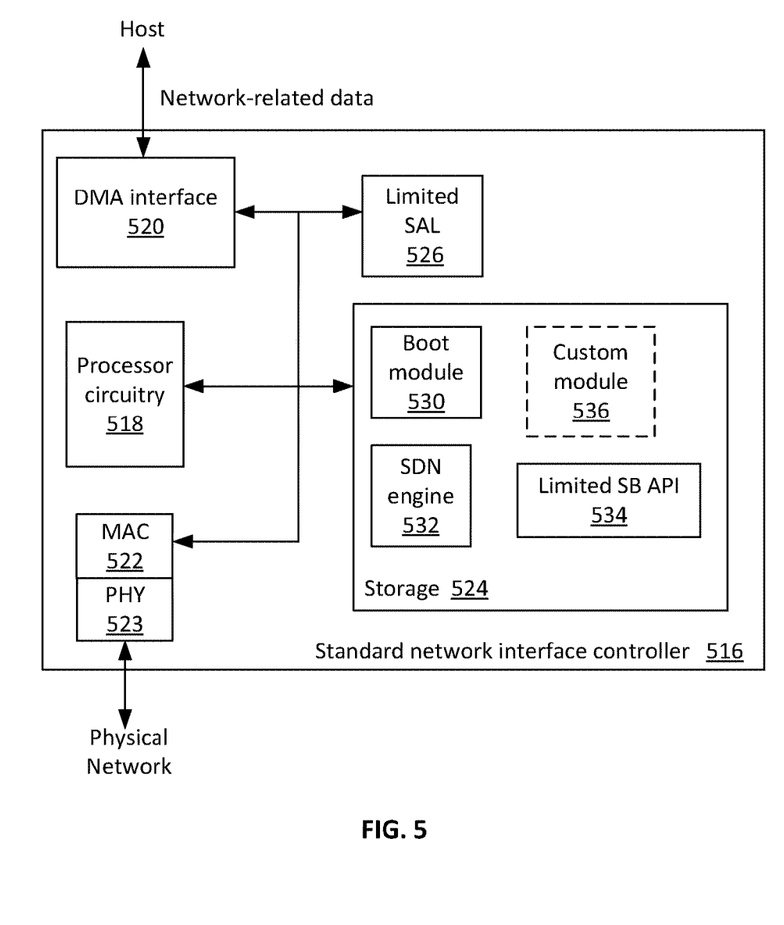
FIG. 5 illustrates another example network interface controller consistent with one embodiment of the present disclosure.

FIG. 5 illustrates another example network interface controller, e.g., standard network interface controller 516, consistent with one embodiment of the present disclosure. The standard network interface controller 516 may have relatively less functionality compared to first NIC 316. The standard network interface controller 516 may be generally configured to perform at least some network interface functions for a hybrid SDN controller, e.g., hybrid SDN controller 120. The standard network interface controller 516 may include processor circuitry 518 configured for relatively limited functionality. Processor circuitry 518 may include, for example, a microcontroller, a microengine, an application-specific integrated circuit (ASIC), a field programmable gate array (FPGA) and/or any other controller circuitry that is generally capable of performing typical network interface controller and/or packet processing functions. For example, a microengine may include a programmable microcontroller. The standard network interface controller 516 may include a direct memory access (DMA) interface 520 configured to facilitate transfer of commands and/or data between standard network interface controller 516 and a host, e.g., host 205, and a medium access controller MAC 522 and PHY 523 configured to couple a computing device, e.g., computing device 102, to network 104.

The standard network interface controller 516 may include limited storage 524 configured to store a boot module 530 configured to boot the processor 518 and an SDN engine 532 configured to initiate operations of a limited SAL 526. Communication between SAL 526 and a host, e.g., host 205, may be performed through, e.g., DMA (Direct Memory Access)/PCIe transactions by DMA host interface 520. Standard network interface controller 516 may be further configured to utilize I/O memory and/or queues that a NIC driver in a host may also be utilizing, e.g., I/O memory 218, queue(s) 220 and NIC driver 216 of FIG. 2. The limited SAL 526 may be configured to utilize the I/O memory 218 and/or queues 220 to exchange network-related data with the host 205. Network-related data may include, e.g., network topology (configuration) updates such as a change in state of a node, addition of a node, exit of a node, etc. Network-related data may further include an identifier that corresponds to which SB API, e.g., SB API 534, and/or custom module, e.g., custom module 536, may be active. Thus, the host 205 and standard network interface controller 516 may be sharing a memory map in order to exchange data.

Limited SAL 526 may be implemented as tables in, e.g., circuitry. Limited SAL 526 may be further configured to utilize a processing unit and/or pipeline in order to manipulate the data stored in the tables and to create the PCIe transactions. Standard network interface controller 516 may be configured to store limited SB API 534. Thus, in this embodiment, limited SAL 526 and limited SB API 534 functionality may be included in standard network interface controller 516. The limitations are related to capability available on the standard network interface controller 516.

Thus, a hybrid SDN controller may be configured with SDN controller functionality distributed between a host and a network interface controller of a computing device. A first portion of a hybrid SDN controller consistent with various embodiments of the present disclosure may be implemented in a host included in the computing device. The first portion of the hybrid SDN controller may include northbound API, network service functions, network orchestration functions and network management functions. A second portion of the hybrid SDN controller may be implemented in a network interface controller included in the computing device. The second portion of the hybrid SDN controller may include a southbound API and a service abstraction layer module that includes a representation of the physical network.

The service abstraction layer and southbound API may be efficiently coded. Implementing the service abstraction layer and southbound API on the network interface is configured to reduce processing load on the host. Networking logic (e.g., network service functions, network orchestration functions and network management functions) may continue to be coded in the high level object oriented language without affecting the network interface programming. Distributing the SDN control functions between the host and the network interface is configured to be transparent to applications utilizing the hybrid SDN controller functionality.

Figure 6:
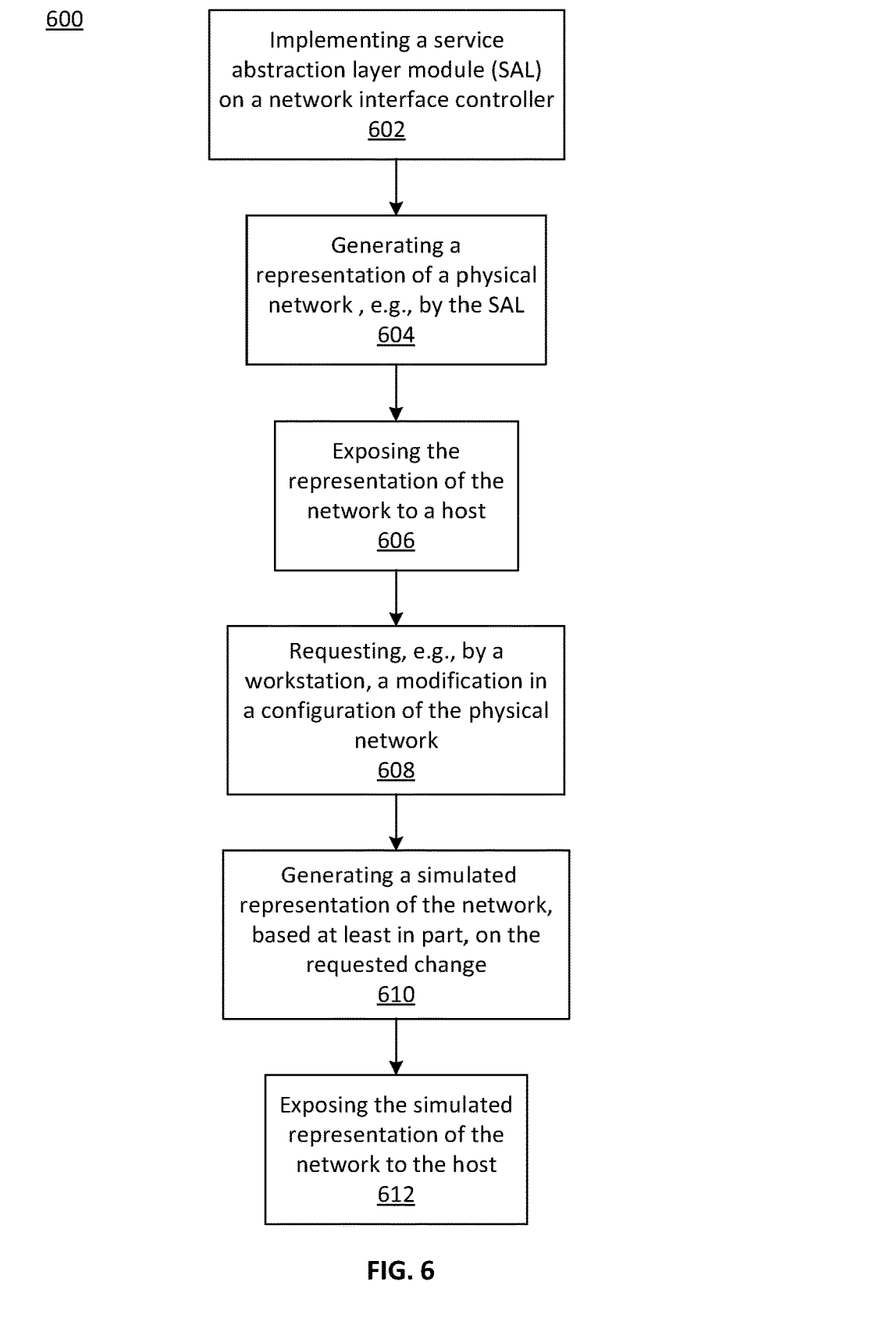
FIG. 6 illustrates a flowchart of example operations of a hybrid software-defined networking (SDN) controller consistent with an embodiment of the present disclosure.

FIG. 6 illustrates a flowchart 600 of example operations of a hybrid software-defined networking (SDN) controller consistent with an embodiment of the present disclosure. The operations may be performed, for example, by first NIC 316, host 205 and/or workstation 410. In particular, flowchart 600 depicts example operations configured to generate and expose a representation of a physical network and a simulated representation of the physical network.

Program flow may begin at operation 602. Operation 602 includes implementing a service abstraction layer module (SAL) on a network interface controller. A representation of a physical network may be generated, e.g., by the SAL, at operation 604. Operation 606 may include exposing the representation of the network to a host. Operation 608 may include requesting, e.g., by a workstation, a change in a configuration of the physical network. A simulated representation of the network, based at least in part, on the requested change, may be generated at operation 610. Operation 612 may include exposing the simulated representation of the network to the host. For example, the simulated representation may be exposed by the SAL.

Figure 7:
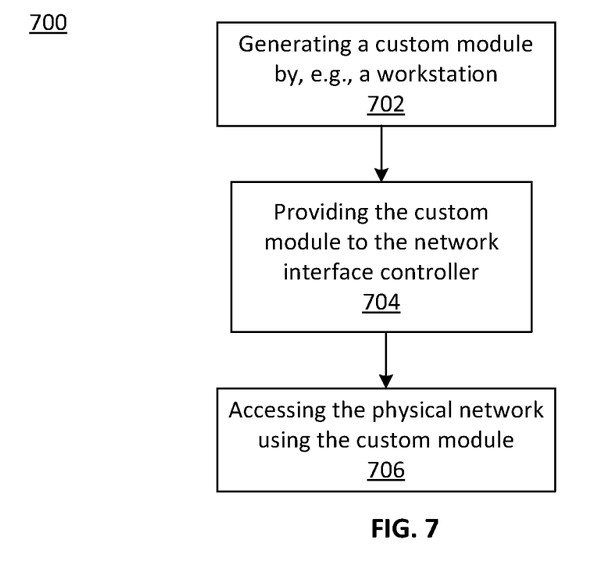
FIG. 7 illustrates another flowchart of example operations of a hybrid SDN controller consistent with an embodiment of the present disclosure.

FIG. 7 illustrates a flowchart 700 of example operations of a hybrid SDN controller consistent with an embodiment of the present disclosure. The operations may be performed, for example, by workstation 410, host 205 and/or network interface controller 316. In particular, flowchart 700 depicts example operations configured to generate a custom module and to access a network with the custom module.

Program flow may begin at operation 702. Operation 702 includes generating a custom module. For example, the custom module may be generated by a workstation coupled to a computing device, e.g., computing device 102. The custom module may be provided to the network interface controller at operation 704. For example, an agent 252 in a host may configured to provide the custom module to the NIC. Operation 706 may include accessing the physical network using the custom module.

Figure 8:
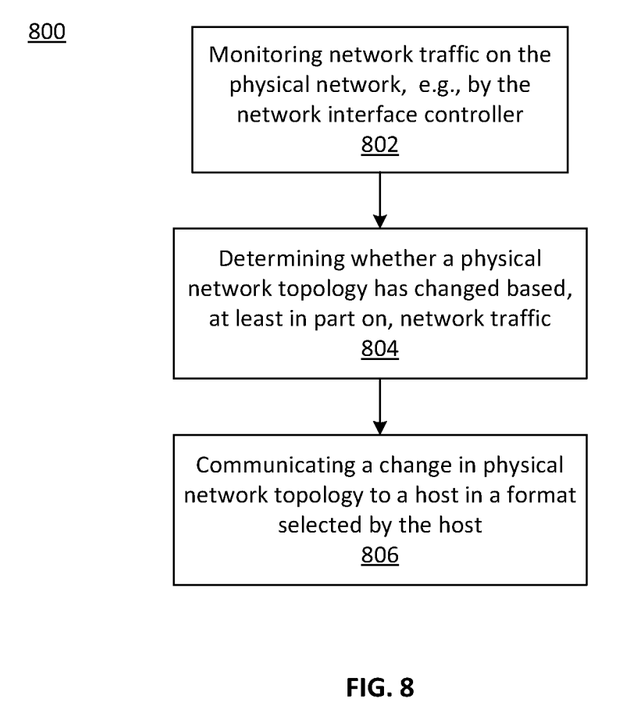
FIG. 8 illustrates another flowchart of example operations of a hybrid SDN controller consistent with an embodiment of the present disclosure.

FIG. 8 illustrates a flowchart 800 of example operations of a hybrid SDN controller consistent with an embodiment of the present disclosure. The operations may be performed, for example, by a network interface controller and/or a host. In particular, flowchart 800 depicts example operations configured to determine whether a physical network topology has changed based, at least in part, on analysis of network traffic. Operation 802 includes monitoring network traffic on the physical network. For example, the network interface controller may be configured to monitor network traffic. Operation 804 may include determining whether a physical network topology has changed based, at least in part on, network traffic. Operation 806 includes communicating a change in physical network topology to a host in a format selected by the host. For example, a service abstraction layer module, e.g., SAL 364, included in the network interface controller may be configured to translate a change in physical network topology from the format of the physical representation of the network 366 included in the SAL 364 to a data format used by, e.g., web services.

While FIGS. 6, 7 and 8 illustrate various operations according to an embodiment, it is to be understood that not all of the operations depicted in FIGS. 6, 7 and/or 8 are necessary for other embodiments. Indeed, it is fully contemplated herein that in other embodiments of the present disclosure, the operations depicted in FIGS. 6, 7 and/or 8 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

The foregoing provides example system architectures and methodologies, however, modifications to the present disclosure are possible. The host processor may include one or more processor cores and may be configured to execute system software. System software may include, for example, an operating system. Host memory may include I/O memory buffers configured to store one or more data packets that are to be transmitted by, or received by, a network interface.

The operating system (OS) may be configured to manage system resources and control tasks that are run on, e.g., host 205, first NIC 316 and/or workstation 410. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

The host and or network interface controller memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processors may include, for example, a processing unit and/or programmable circuitry in the host 205 and/or other processing unit or programmable circuitry in the first NIC 316 and/or the workstation 410. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

In some embodiments, a hardware description language may be used to specify circuit and/or logic implementation(s) for the various modules and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Physical network 104 may comprise a packet switched network. Network interface controller 316, 516 may be capable of communicating with node(s) 106a, ..., 106n and/or network device(s) 108a, ..., 108n using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, network interface controller 316, 516 may be capable of communicating with node(s) 106a, ..., 106n and/or network device(s) 108a, ..., 108n, using an X.25 communications protocol. The X.25 communications protocol may comply or be compatible with a standard promulgated by the International Telecommunication Union-Telecommunication Standardization Sector (ITU-T). Alternatively or additionally, network interface controller 316, 516 may be capable of communicating with node(s) 106a, ..., 106n and/or network device(s) 108a, ..., 108n using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network interface controller 316, 516 may be capable of communicating with node(s) 106a, ..., 106n and/or network device(s) 108a, ..., 108n, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

Thus, a hybrid SDN controller consistent with various embodiments of the present disclosure is configured to distribute SDN controller functionality between a host and a network interface of a computing device, e.g., a server. A first portion of a hybrid SDN controller consistent with various embodiments of the present disclosure is configured to be implemented on the host. The first portion may include northbound Application Programming Interface(s) (API(s)) and networking logic including network service functions, network orchestration functions and network management functions. The second portion of the hybrid SDN controller is configured to be implemented on the network interface controller. The second portion may include a southbound API and a service abstraction layer (e.g., SAL module) that includes a representation of the physical network.

Thus, a network interface consistent with various embodiments of the present disclosure is configured as a functional unit that includes network interface functionality as well as the portion of the hybrid SDN controller that includes the service abstraction layer and the southbound API. The service abstraction layer and southbound API may be efficiently coded. In some embodiments, custom module(s) related to the southbound API may be implemented by an enterprise. Implementing the service abstraction layer and southbound API on the NIC is further configured to reduce processing load on the host. Networking logic may continue to be coded in the high level object oriented language without affecting the NIC programming. Distributing the SDN control functions between the host and the NIC is configured to be transparent to an application executing on a node in the physical network.

Accordingly, the present disclosure provides an example network interface controller. The example network interface controller includes a portion of a hybrid software-defined networking ("SDN") controller, the portion of the hybrid SDN controller including a service abstraction layer module ("SAL") and a southbound application programming interface ("SB API"), the SAL including a representation of a physical network.

The present disclosure also provides an example method. The example method includes implementing a service abstraction layer module ("SAL") on a network interface controller; generating, by the SAL, a representation of a physical network; and exposing, by the SAL, the representation of the physical network to a host.

The present disclosure also provides an example computing device. The example computing device includes a host and a network interface controller. The host includes a first portion of a hybrid software-defined networking ("SDN") controller, the first portion of the hybrid SDN controller including a plurality of SDN modules and a northbound application programming interface ("API"). The network interface controller includes a second portion of the hybrid SDN controller, the second portion of the hybrid SDN controller including a service abstraction layer module ("SAL") and a southbound application programming interface ("SB API"), the SAL including a representation of a physical network.

The present disclosure also provides an example system that includes one or more storage devices having stored thereon, individually or in combination, instructions that when executed by one or more processors result in the following operations including: implementing a service abstraction layer module ("SAL") in a network interface controller; generating a representation of a physical network; and exposing the representation of the physical network to a host.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network interface controller (NIC) to couple to a host computing device, the NIC comprising:
    a network stack;
    a host interface to couple to the host computing device; and
    a hybrid software-defined networking (SDN) controller implemented in circuitry of the NIC, the hybrid SDN controller to perform at least one SDN control function to reduce SDN processing load on the host computing device, the hybrid SDN controller including:
        a service abstraction layer (SAL) to:
            provide a representation of a physical network based at least in part on the network stack; and
            in response to a request including a change in configuration of the physical network, provide a simulated representation of the physical network based at least in part on the network stack and the change in configuration included in the request; and
        a southbound application programming interface (SB API).

2. The NIC of claim 1, wherein the SAL is further to execute testing utilizing the simulated representation of the physical network.

3. The NIC of claim 1, wherein the SAL is further to expose the simulated representation of the physical network to the host computing device as an actual representation of the physical network.

4. The NIC of claim 1, wherein the SAL is further to translate network data into a form appropriate for SDN controller functionality.

5. The NIC of claim 1, wherein the hybrid SDN controller further comprises at least one custom module, the custom module corresponding to a custom application programming interface ("API").

6. A method, comprising:
    implementing a hybrid software-defined networking (SDN) controller in circuitry of a network interface controller (NIC), wherein:
        the NIC is to couple to a host computing device; and
        the hybrid SDN controller is to perform at least one SDN control function to reduce SDN processing load on the host computing device, the hybrid SDN controller including:
            a service abstraction layer module (SAL); and
            a southbound application programming interface (SB API);
    providing, by the SAL, a representation of a physical network based at least on a network stack; and
    providing, by the SAL responsive to a request including a change in configuration of the physical network, a simulated representation of the physical network based, at least in part, on the network stack and the change included in the request.

7. The method of claim 6, further comprising executing, via the SAL responsive to the request, testing based on the simulated representation of the physical network based, at least in part, on the network stack and the change included in the request.

8. The method of claim 6, further comprising exposing, via the SAL responsive to the request, the simulated representation of the physical network to the host computing device as an actual representation of the physical network.

9. The method of claim 6, further comprising translating, via the SAL, network data into a form appropriate for SDN controller functionality.

10. The method of claim 6, wherein the hybrid SDN controller further comprises at least one custom module, the custom module corresponding to a custom application programming interface ("API").

11. At least one non-transitory computer-readable storage device having stored thereon instructions which, when executed by at least one processor, result in operations comprising:
   implement a hybrid software-defined networking (SDN) controller in circuitry of a network interface controller (NIC), wherein:
      the NIC is to couple to a host computing device; and
      the hybrid SDN controller is to perform at least one SDN control function to reduce SDN processing load on the host computing device, the hybrid SDN controller including:
         a service abstraction layer module (SAL); and
         a southbound application programming interface (SB API); and
   provide, by the SAL, a representation of a physical network based at least on a network stack; and
   provide, by the SAL responsive to a request including a change in configuration of the physical network, a simulated representation of the physical network based, at least in part, on the network stack and the change included in the request.

12. The at least one non-transitory computer-readable storage device of claim 11 having stored thereon additional instructions which, when executed by the at least one processor, result in further operations comprising:
   execute, via the SAL responsive to the request, testing based on the simulated representation of the physical network based, at least in part, on the network stack and the change included in the request.

13. The at least one non-transitory computer-readable storage device of claim 11 having stored thereon additional instructions which, when executed by the at least one processor, result in further operations comprising:
   expose, via the SAL responsive to the request, the simulated representation of the physical network to the host computing device as an actual representation of the physical network.

14. The at least one non-transitory computer-readable storage device of claim 11 having stored thereon additional instructions which, when executed by the at least one processor, result in further operations comprising:
   translate, via the SAL, network data into a form appropriate for SDN controller functionality.

15. The at least one non-transitory computer-readable storage device of claim 11 wherein the hybrid SDN controller further comprises at least one custom module, the custom module corresponding to a custom application programming interface ("API").

* * * * *